Figure 1:
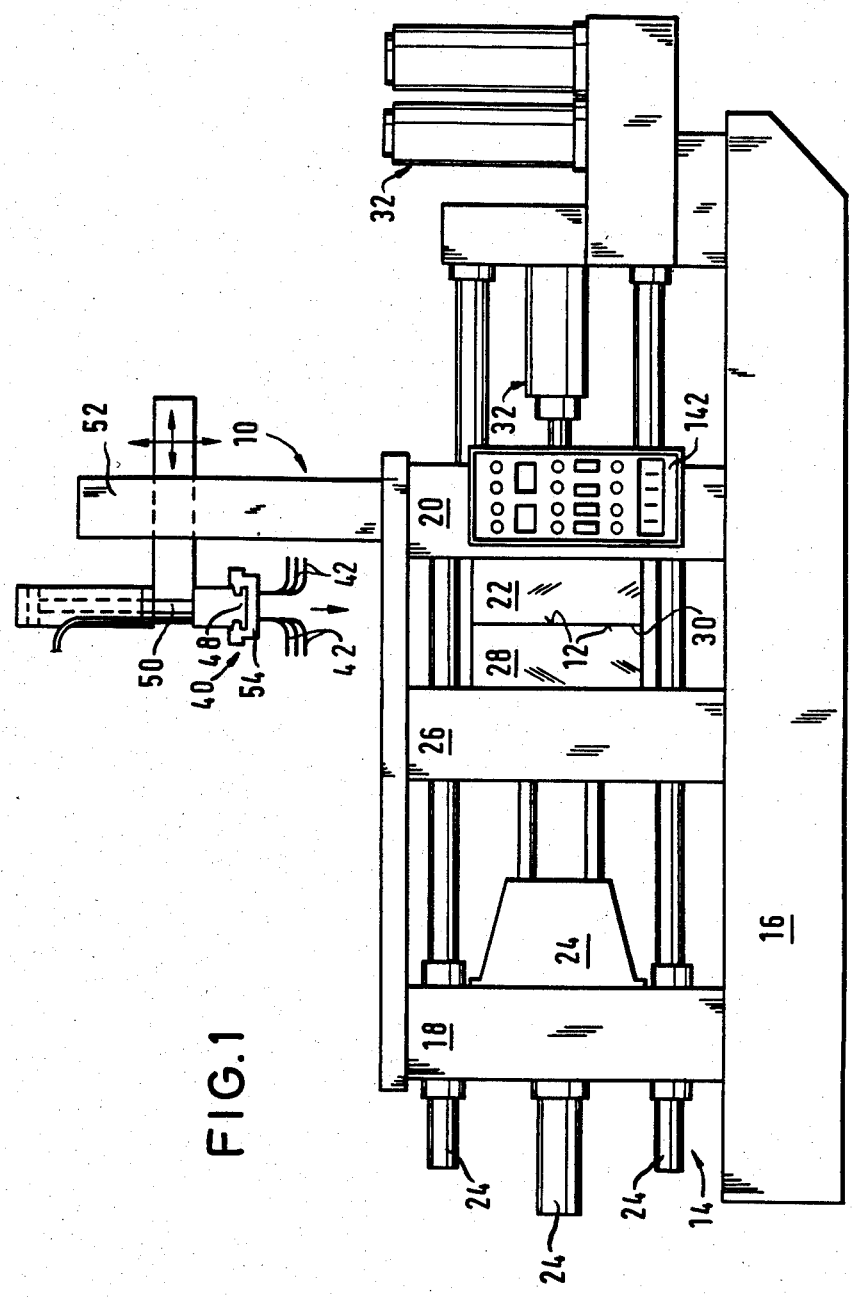

United States Patent [19]

Thurner

[11] Patent Number: 4,605,170
[45] Date of Patent: Aug. 12, 1986

[54] APPARATUS FOR WETTING MOLD SURFACES WITH A LIQUID

[75] Inventor: Hans Thurner, Baldham, Fed. Rep. of Germany

[73] Assignee: Bayrisches Druckgusswerk Thurner GmbH & Co. KG, Bavaria, Fed. Rep. of Germany

[21] Appl. No.: 768,811

[22] Filed: Aug. 23, 1985

[51] Int. Cl.⁴ .................... B29C 39/22; B29C 45/17; B29C 45/83
[52] U.S. Cl. .................. 239/444; 118/313; 118/317; 118/323; 164/149; 164/158; 164/267; 239/551; 239/562; 425/96; 425/98; 425/100; 425/103; 425/107; 425/182; 425/190; 425/193
[58] Field of Search ............... 425/90, 91, 92, 96, 425/98, 100, 103, 225, 227, 107, 182, 190, 193; 118/313, 315, 317, 323; 239/442, 444, 551, 563, 562; 164/149, 158, 267

[56] References Cited

U.S. PATENT DOCUMENTS

| 3,248,762 | 5/1966 | Wagner | 164/267 |
| 3,544,355 | 12/1970 | Ott | 164/149 |
| 3,633,651 | 1/1972 | Ruhlandt | 425/103 |
| 3,941,537 | 3/1976 | Abraham | 164/149 |
| 4,420,028 | 12/1983 | Nelson | 425/107 |
| 4,428,414 | 1/1984 | Teplinsky et al. | 164/158 |

FOREIGN PATENT DOCUMENTS 2411316 4/1975 Fed. Rep. of Germany .

Primary Examiner—Willard E. Hoag
Attorney, Agent, or Firm—Dennison, Meserole, Pollack & Scheiner

[57] ABSTRACT

For cooling, cleansing and/or lubricating purposes on a pressure casting machine 14 there is arranged an apparatus 10 for wetting mold surfaces 12 by spraying pressurized fluid thereon, which comprises a spraying head 40 provided with spraying nozzles 42 apt to be adjusted as regards direction, in which spraying head channels 44 and adjustable throttle valves 46 are disposed. To form such apparatus such that it is suited for the selective treatment of the different mold surfaces, no expensive adaptation operations being necessary with each change of mold and/or each re-use of such mold, that moreover a rapid automatic pressure casting operation is guaranteed and that high manufacturing and storage costs are avoided. The spraying head 40 is composed of stationary member 48 and an easily exchangeable spraying nozzle carrier 54 sealingly resting thereagainst, the stationary member containing channels 44 and throttle valves co-acting with said channels and being connected to the movable holding elements, and the spraying nozzle carrier as a relatively simple and inexpensive constructional member essentially being only provided with spraying nozzles 42 and, if necessary, adjusting elements for adjusting throttle valve 46.

17 Claims, 7 Drawing Figures

APPARATUS FOR WETTING MOLD SURFACES WITH A LIQUID

The invention relates to an apparatus for wetting mold surfaces with a liquid for cooling, cleansing and/or lubricating purposes for use in pressure casting machines or the like.

In pressure casting processes it is necessary to wet the opened mold inside with a liquid serving as a separating, cooling and/or lubricating mixture, prior to the casting procedure. It is of particular importance to do so to avoid an adhering of the liquid casting metal to the mold wall owing to too high an adhesion thereto. Upon casting a proper separation of the casting from the mold wall should be guaranteed. This is why prior to every new casting procedure the liquid is sprayed as a separating agent onto the inner surface of the mold. Moreover, all the sliding surfaces of a mold, such as guide pins, ejectors, guides of movable partial cods, etc. must be lubricated. For this reason, liquids which act not only as a separating agent but simultaneously as a lubricant are sprayed onto the surfaces in question. Finally, a pressure or die casting mold is exposed to considerable thermal strain owing to the high temperatures of the casting metal. Since heat removal from the interior of the mold cannot be effected uniformly through the entire exterior mantel of the mold (the heat removal is e.g. dependent on the thickness of the mold wall) there is the additional necessity to selectively cool the mold after a molding procedure. This may also be brought about by a relatively cold liquid sprayed thereupon.

It is known to spray liquid by the aid of a spraying means selectively into molds between two die casting procedures for the purposes explained above more extensively, and when doing so it must be guaranteed that mold cavities and/or projections are, indeed, reached by the sprayed jet. It has already been prior art to selectively and intensively spray a major amount of cooling liquid on especially heavily heated parts of the mold than on parts of the mold which are not exposed to so strong a heat. For this end, spraying heads have been constructed which have been developed and manufactured by individual adjustment to a respective mold and have an arrangement of spraying nozzles resp. cross sections on spraying nozzles which are precisely tailored to the shape of mold. Hence, such spraying head may be used exclusively in connection with the determined corresponding mold. This means that when the mold is changed, the spraying head must be exchanged, as well, and be stored together with the mold, which renders store keeping and production costs of castings by far more expensive, since in addition to the mold which is extremely expensive, anyhow, a very expensive spraying head comprising a throttle valve etc. must be manufactured and paid by the customer ordering the respective mold.

DE-OS No. 24 11 316 reveals a spraying means to be used in molding machines and showing the features of the prefatory clause of claim 1. There is, above all, provided a spraying head comprising a multitude of spraying nozzles which are adjustable as regards direction and which are connected to a liquid and compressed air inlet through head-internal channels. Said inlets are, of course, connected to liquid resp. compressed air tanks. Each spraying nozzle comprises an adjustable throttle valve so as to purposively influence the amount of compressed air and/or liquid passed on to the spraying nozzles. The spraying head itself is brought in front of the mold surface to be sprayed on by means of movable holding elements.

A spraying head of this type is not only useful for a single determined mold but can be used for molds of different embodiments owing to the adjustability of its nozzle arrangement. But the adaptation of the arrangement of spraying nozzles to a new mold, in particular the directional adjustment of the single nozzles and the adjustment of the respective throttle valves is rather time-consuming and can be determined exclusively in an empirical way. This means that in the major part of cases after a first rough adjustment a pressure casting procedure whose quality possibly shows that some further adjustments are necessary must be carried out. Such procedure is expensive both as regards material and time.

Moreover, in case of the throttle valves disposed in the known spraying head "static" valves are concerned, which means that the maximum cross section of the valve as once adjusted is always the same both during the spraying step and before and after spraying. Such "static" valves tend to clog and to paste, and this all the more so when a spraying head has not been used over a longer period of time and remainders of lubricating liquid gum in the relatively small valve cross sections.

The object underlying the invention is to design an apparatus for wetting mold surfaces with a liquid for cooling, cleansing and/or lubricating purposes so as to render it suitable for the purposive treatment of differing mold surfaces, where it is not necessary to carry out expensive adjusting operations at every change of mold or at every renewed re-use of a mold, respectively, where a rapid automatic die casting operation without refuse is guaranteed and where too high expenditure for manufacture and store keeping are avoided.

It is considered the core of the invention to make a two-part spraying head, where one of the parts (and this is firmly fixed to the automatic die casting machine) contains all of the cost-intensive constructional elements. To the part (spraying head carrier) which can be attached to the machine-fixed spraying head part in a simple mode there are substantially coordinated only the spraying nozzles which—as regards their direction of spraying and spraying intensity—are adapted once to a pertaining mold. Put differently, all cost-intensive parts of the spraying means remain combined with the die casting spraying machine (or forging machine, stamping machine, deep-drawing machine and the like) and are applicable to different molds; in case of changing the mold nothing but a relatively inexpensive member, i.e. the individually adapted spraying head carrier, is stored together with the mold and can be employed again by a few manipulations without any substantial adjusting operation when the mold is re-used.

It is of particular advantage when the spraying nozzle carrier has the shape of an elongated substantially U-shaped beam which with its U-cross beam rests against a sealing surface of the block-shaped stationary member and laterally embraces the stationary member by its two U-legs, as then the relatively sensitive parts of construction are well protected in the stationary part and the spraying head carrier is already subjected to an advance adjustment as against the stationary part in particular by the lateral embrace, prior to the final mounting (e.g. by screwing).

Due to the relatively high weight of the spraying head carrier it is of further advantage when the inner sides of the U-legs are provided with slide-in ribs in the longitudinal direction of the spraying nozzle carrier, which lie in grooves or the like in the side walls of the stationary part. The spraying head carrier, thus, can be slided onto the stationary member with particular ease and be fixed in sliding end position by screwing. To avoid that damage is done to the relatively sensitive sealing surface and members projecting therefrom (e.g. O-rings or adjusting elements) by sliding the spraying head carrier onto the stationary member it is advantageous to provide a certain clearance between the U-crossbeam and the sealing surface of the stationary member for the sliding-on, according to claim 4. This is achieved by an intentional, not insubstantial tolerance in the sliding elements. Advantageously, the tolerance should be larger than the maximum projecting lengths of members projecting from the sealing surface.

The two-part character of the spraying head is especially advantageous since it makes it possible to program the totality of all throttle valves by adjusting elements disposed in the spraying nozzle carrier in the form of projections or the like, co-acting with resilient elements (limiting sliders) of the throttle valves, by simple screwing from below, which programming exactly corresponds to the spraying jet intensity required for a definite mold. The individual adaptation of the spraying head to an inner mold of whichever shape is limited to a few mainpulations.

If the adjusting elements are manually operable adjusting screws, the spraying head carrier plate is apt for further use, when some day the pertaining mold is no longer needed. By simply turning the adjusting screws the "desired spraying intensity" of the spraying head carrier is "programmed" anew and updated to the changing requirements.

The throttle valves, advantageously, are formed to be dosing valves pneumatically controllable by control air. In a blind-hole type valve bore optionally having step-wisely changing bore cross sections there is firstly provided a limiting slider which in part projects from the sealing surface and co-acts with the adjusting element—be it adjustable as an adjusting screw or be it non-adjustable as a trough or nose.

On the other side of the limiting slider which is on the valve's inner side follows a pressure spring which attacks the surface of an adjusting piston on the outside of the valve, which adjusting piston can be attacked by control air on its side being on the valve's inner side and averted from the adjusting slider, and thus can be pressed against the limiting slider by compressing the above-named pressure spring so as to open the valve. The sliding way of the adjusting piston is thus limited by the axial position of the limiting slider.

On the valve's inner side the adjusting piston is followed by a locking slider via a rigid intermediate element, e.g. a control rod, which slider in the blocking position blocks by a lateral surface a liquid channel flowing into the valve bore, and in its opening position more or less releases the liquid channel when the adjusting piston lies close to the limiting slider, the rate of release again being dependent on the adjusting element of the spraying nozzle carrier. Put differently, by the above-named valve elements (limiting slider, adjusting piston, intermediate element) the arrangement "programmed into" the spray nozzle carrier of the adjusting element is transferred to the locking slider.

To guarantee that the "programming" of the adjusting screws, which once has been defined as a screwed-in position, does not change unintentionally during longer use or storage of the spray nozzle carrier a safety means, preferably in the form of a safety screw or counter screw is provided within the range of the adjusting screw.

To treat the power-transmitting dosing valve-adjusting elements with care it is of advantage to bring the spraying head holder firstly into its sliding end position on the stationary member by the provision of the clearance and, then, to bring it into firm and sealing contact with the sealing surface cautiously from below by holding screws which are preferably undetachable ones, by simultaneously transferring the "programming" onto the limiting sliders.

In addition, it is advantageous to provide the adjusting elements (adjusting screws, limitng sliders and adjusting piston) with a central bore extending in the axial direction, as then the adjusting piston may be moved manually and loosened from outside in an especially simple way by the aid of a hook or the like, in case it gets jammed or pasted some day. What is, moreover, treating the material with care is when a resilient damping member, such as a rubber ring or the like, is provided between adjusting piston and limiting slider.

An especially sensitive adjustment of the amount of liquid allowed to pass is achieved by the special shaping of the locking sliders, the adjusting procedure of the adjusting screw is eased by a self-locking in the form of a safety means against torsion.

With a removed spraying nozzle carrier claim 15 renders simple opening and dismantling of the dosing valves for cleansing and repairing purposes possible.

If the spraying nozzles are disposed on the free end of flexible spraying tubes there is not only an easy directional adjustment of the spraying jet possible, but the spraying nozzle, above all, can be brought in the direct vicinity of the area of the mold to be sprayed upon, by which a particularly high spraying intensity is obtained. If the spraying tubes are releasable, e.g. if they are screwed on to the spraying nozzle carrier, spraying tubes of different lengths and different cross sections can be provided at the spraying nozzle carrier, like extended spider legs. In addition, it is advantageous to arrange compressed air nozzles which are also fixed to nozzle tubes at the spraying nozzle carrier next to the spraying nozzles. After the spraying procedure the sprayed liquid can be blown off partially or removed fully by said tubes. The spraying nozzles for spraying the liquid are advantageously screwed onto the free end of the corresponding spraying tube and, thus, it is easy to exchange and/or cleanse them. Moreover, the spraying nozzles can be swivelled separately as against the spraying tube and, therefore, undercut parts of the mold can be sprayed upon thoroughly, as well.

To secure a fully automatic die casting operation it is of further advantage to design the holding elements as motor driven jib in a manner known per se and to mount them firmly at the frame of the die casting machine. To feed control air purposefully to individual dosing valves or groups of such valves, there should finally be provided an input means in the form of a stored program control which automatically positions the spraying head after opening the mold and removing the blank and causes the spraying cycle to run.

Figure 2:
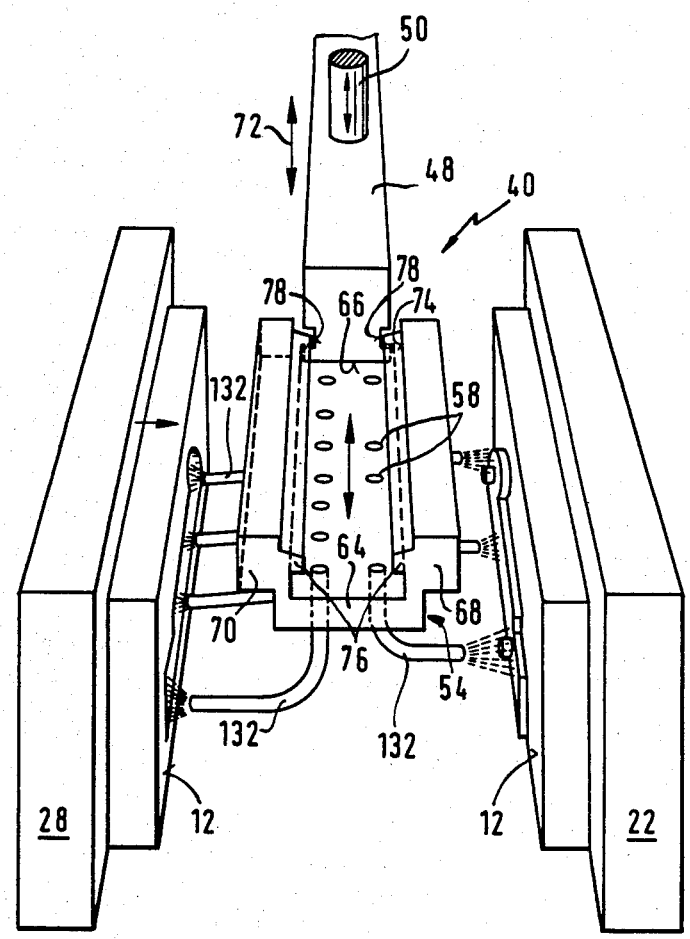
Figure 3:
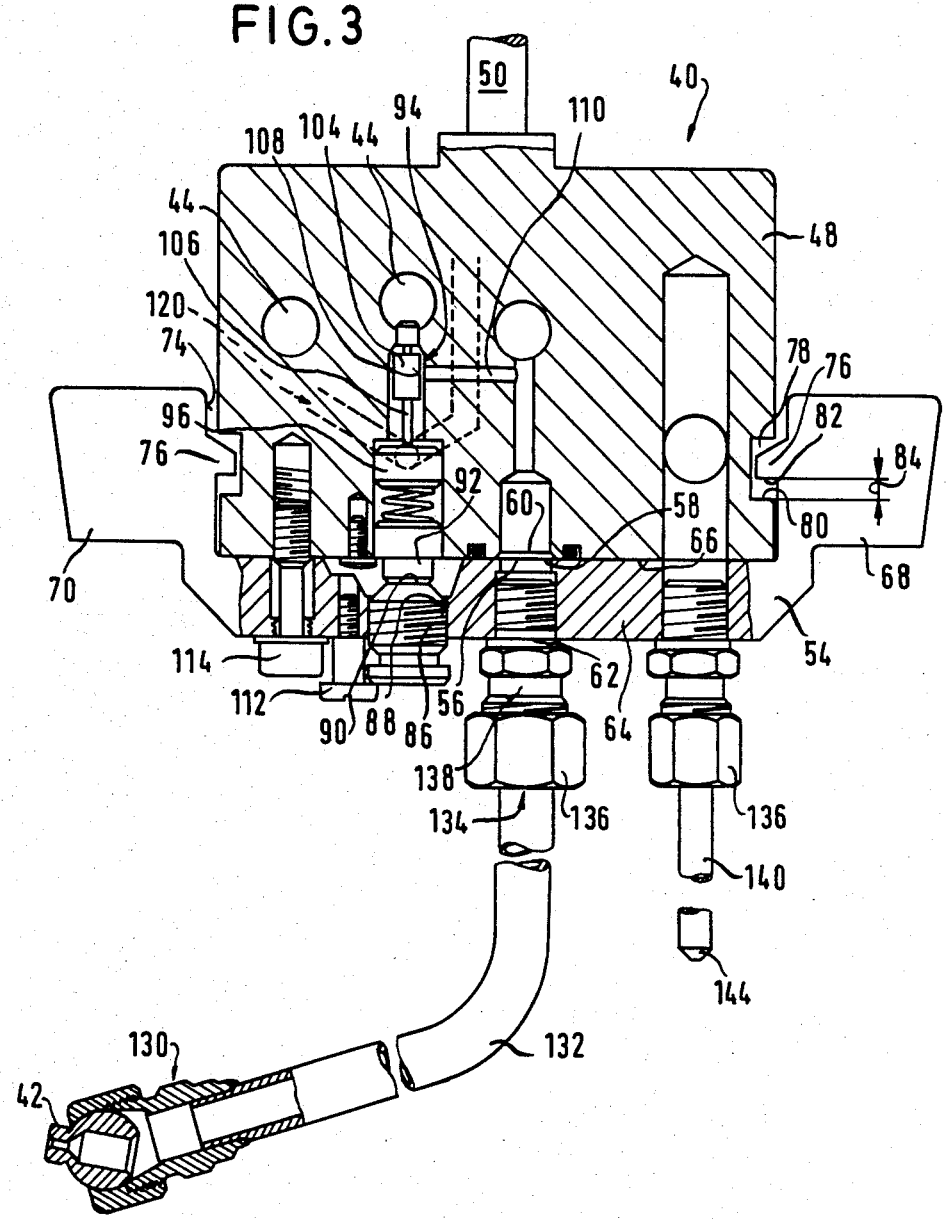
Figure 4:
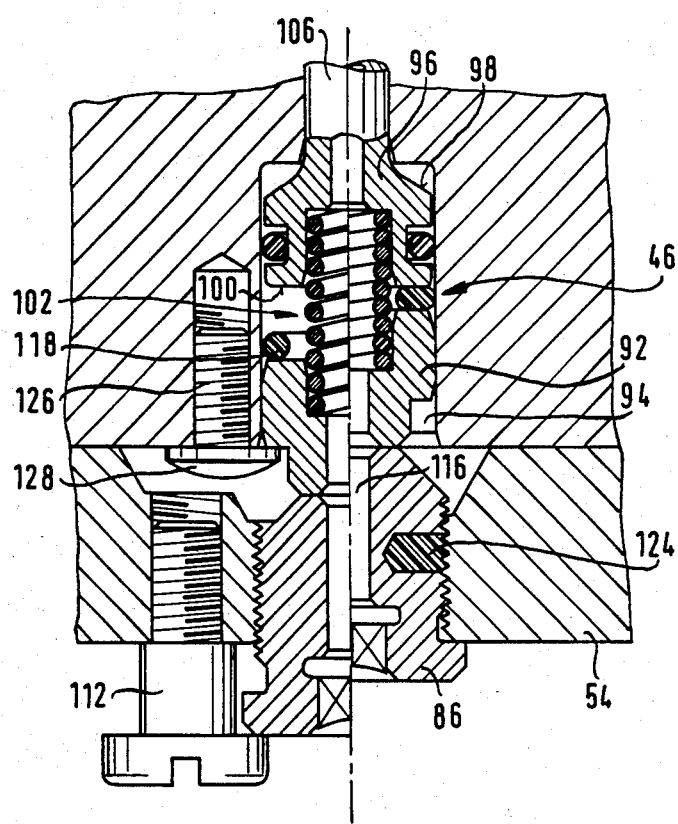
Figure 5:
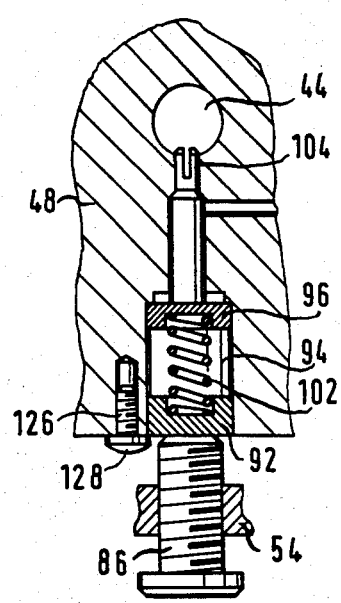
Figure 6:
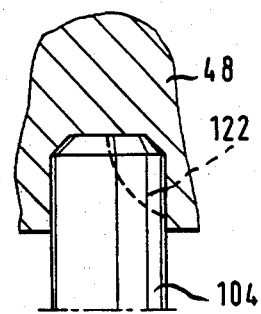
Figure 7:
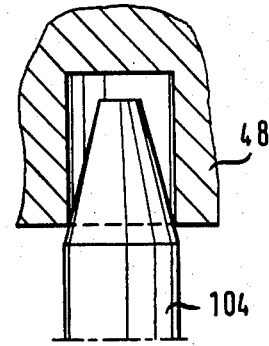

The invention is explained in detail by the aid of an example of embodiment in the drawings:

FIG. 1 shows a schematic elevation of a pressure casting machine provided with an apparatus for wetting the mold surfaces, FIG. 2 is a perspective view of the spraying head with the spraying nozzle carrier taken off from the stationary member, FIG. 3 is a sectional view of the spraying head in the final mounting position, FIG. 4 is detailed sectional view of the spraying head area provided with a dosing valve, FIG. 5 is a detailed sectional view according to FIG. 4 with another valve embodiment, FIG. 6 is a partial sectional view of the valve area of another embodiment, provided with the locking slider, FIG. 7 shows a sectional view according to FIG. 6 of another embodiment.

Apparatus 10 for wetting mold surfaces 12 with a liquid for cooling, cleansing and/or lubricating purposes is intended to be used at a pressure casting machine 14. A machine of this type consists of machine bed 16 and columns 18, 20 arranged thereupon. On the latter there is fixed a stationary first mold half 22, on column 18 hydraulic elements 24 by which carriage 26 can be slided with movable second half of mold 28 affixed thereto are mounted. In FIG. 1 the two halves of mold 22, 28 form a closed pressure casting mold showing a die line 30.

To introduce the casting material into the closed mold there is provided a casting device, as a whole marked by 32, on column 16.

Apparatus 10 for wetting mold surfaces with a liquid shows a spraying head 40 having a multitude of spraying nozzles 42 which are suited to be adjusted as regards their direction, and a liquid and compressed air inlet. To pass on the compressed air or liquid present at the inlets to spraying nozzles 42 there are provided channels 44 within spraying head 40; in the spraying nozzles adjustable throttle valves 46 are disposed to directly influence the amount of liquid and/or compressed air passed on to the spraying nozzles. Spraying head 40 consists of stationary member 48 which is affixed to column 20 through holding elements 50, namely a horizontally and vertically slidable and swivelling construction 52 resembling a gallows. On the stationary member 48 of spraying head 40 spraying nozzle carrier 54 provided with spraying nozzles 42 is arranged readily exchangeably. As is particularly evident from FIGS. 2 and 3, in stationary member 48 there are provided the liquid and compressed air inlets, channels 44 and throttle valves 46. But spray nozzle carrier 54 is a relatively simple constructional member and shows passage bores 56, whose inner end 58 is in alignment with outlet openings 60 of channels 44 and whose outer end 62 is connected with spraying nozzles 42.

As is clearly evident from FIG. 2, spraying nozzle carrier 54 is formed as an elongated beam of an essentially U-shaped cross section, which rests against lower sealing surface 66 of the block-type stationary member 48 with its U-cross-head 64 and laterally embraces stationary member 48 by its two U-legs 68, 70. To render a sliding of spraying nozzle carrier 54 onto stationary member 48 in the longitudinal direction of the beam possible, quasi as a pre-mounting, slide-in ribs 76 engaging with corresponding longitidinal grooves 78 of the lateral walls of stationary member 48 project from the inner sides 74 of U-legs 68, 70 in the longitudinal direction of the beam. When jointly sliding the spraying nozzle carrier 54 onto stationary member 48 both members have mutual clearance owing to the fact that between the grooved lateral walling 80 on the side of the spraying nozzle and the opposite ribbed lateral area 82 clearance 84 is formed in a sealing final mounting position according to FIG. 3, which clearance is larger than the maximum projecting lengths of parts projecting from sealing surface 66, such as sealings or valve portions described more extensively below.

Throttle valves 46 arranged in stationary member 48 can be adjusted and for doing so adjusting elements which act on the throttle valves by a simple assembly are provided on the spraying nozzle carrier 54. In the example of embodiment as illustrated the adjusting elements are formed as manually turnable adjusting screws 86 having a socket head cap which are screwed into tapholes 88—extending coaxially to the center axle of the valve—of spraying head carrier 54 and attack a limiting slider 92 partially projecting from sealing surface 66 from below with their inner ends 90.

The detailed structure of the throttle valves used preferably is, in particular, evident from FIG. 4. The throttle valves are formed as dosing valves pneumatically controllable by control air and are arranged in a valve bore 94. As has already been mentioned above, they consist of the limiting slider co-acting with adjusting screw 86, and an adjusting piston 96 attacked by control air on side (top side) 98 averted from the limiting slider and supported with its bottom side 100 on the limiting slider by means of pressure spring 102, the axial position of said slider limiting the sliding way of the adjusting piston, as is made plain by the sectional view of the adjusting screw of FIG. 4. Moreover, locking slider 104 not shown by FIG. 4 (cf. FIG. 3) is provided which is rigidly connected with adjusting piston 96 through control rod 106 and blocks liquid channel 110 flowing into valve bore 94 by lateral surface 108 in its blocking position resp. in its opening position, where adjusting piston 96 lies close to limiting slider 92, releases at least in part liquid channel 110, dependent on the position of adjusting screw 86.

The screwed-in position of adjusting screw 86 is secured by safety screw 112 against unintentional torsion for a long term. The final mounting position shown in FIG. 3 (in said position clearance 84 within the groove area is resultant) is performed by holding screws 114 which are arranged in spraying nozzle carrier 54 and are designed as so-called undetachable screws.

FIG. 4 makes plain that adjusting screw 86, limiting slider 92 and adjusting piston 96 each are provided with a central bore 116 extending in the axial direction and being in alignment with each other so as to have a passage to locking slider 104 by means of a hook-type object in order to loosen said locking slider in case it should be stuck.

Pressure spring 102 is surrounded by an annular resilient damping member 118 to avoid a violent meeting of adjusting piston and limiting slider, when control air is blown in through control air channel 120.

FIGS. 5-7 illustrate differing embodiments of the upper ends of locking sliders 104, which according to FIG. 5 may be slotted or according to FIG. 6 may have a lateral recess 122 or according to FIG. 7 may have the shape of a truncated cone.

To secure the adjusting screw 86 against torsion a plastic insert 124 forming a section of the screw jacket in the threaded area is provided which secures a certain self-locking of the adjusting screw.

The final position of limiting slider 92 faces spraying nozzle carrier 54 and is determined by stop screw 126 extending parallelly to valve bore 94 and blocking by a sector of its screw head 128 the axial movement of limiting slider 92 in the outward direction.

Spraying nozzles 42 are disposed on free end 130 of flexible spraying tubes 132 which on their attachment ends 134 are provided with an attachment thread (cap screw 136) for being screwed with a counter-thread in the form of a screwing-in adapter 138 provided on spraying nozzle carrier 54. Near spraying tubes 132 there is equally fixed a nozzle tube 140, at the free end of which a compressed air nozzle is arranged.

Spraying nozzles 42 are screwed onto free end 130 of the respective spraying tube 132 and can be swivelled separately as against the tube axis of free end 130 owing to a spherical embodiment.

To directly feed control air to the individual throttle valves 46 or groups of those an input device formed as a stored program control (142) is affixed to machine bed 16 and be used also for controlling the hydraulic elements 24 and/or casting means 32, at the same time.

What is claimed is:

1. Apparatus for wetting mold surfaces with a pressurized fluid for cooling, cleansing and lubricating purposes in pressure casting machines including a pair of mold elements comprising:
    a spraying head having at least one directionally adjustable spraying nozzle;
    said spraying head having pressure fluid inlet and pressure fluid feed line means;
    channel means interconnecting said inlet with each spraying nozzle;
    means defining at least one adjustable throttle valve to directly control the pressurized fluid directed to each spraying nozzle;
    vertically and horizontally movable means for positioning said spraying head relative to said mold to spray said pressure fluid on said mold;
    said spraying head further including an elongated manifold member and a replaceable spraying nozzle carrier sealingly secured to said elongated manifold, said manifold being fixed relative to said means for positioning, said elongated manifold member being provided with the inlets, channels and throttle valves for receiving, distributing and controlling the flow of said pressurized fluid therethrough; and
    said spraying nozzle carrier slidably mounted on said manifold member and including passage bores aligned with and interconnecting said channels in said manifold member with said spraying nozzles for delivery of said pressure fluid to said mold surfaces.

2. The apparatus according to claim 1 wherein said spraying nozzle carrier is an elongated, generally U-shaped beam with its U-crosshead in sealing relation with said manifold member and embraces said manifold member laterally with its two U-legs.

3. The apparatus according to claim 1 wherein said U-legs include aligning ribs extending in the longitudinal direction of said spraying nozzle carrier and interconnecting with complementary longitudinal grooves in the side walls of said manifold member.

4. The apparatus according to claim 3 wherein said grooves and rails are configured to provide a clearance therebetween when said nozzle carrier and said manifold member are in a sealing final mounting position.

5. The apparatus according to claim 1 wherein said throttle valves are disposed in said manifold member and coact with adjusting elements in said spraying nozzle carrier.

6. The apparatus according to claim 5 wherein said adjusting elements are formed as manually operable adjusting screws arranged in threaded bores of said spraying nozzle carrier and extend generally coaxially with the valve axis and engage a limiting slider.

7. The apparatus according to claim 1 wherein said throttle valves are pressure responsive valves controllable by pressure fluid and arranged substantially coaxially to each other.

8. The apparatus according to claim 1 wherein the sliding interconnection of said spraying nozzle carrier and grooved side walls of said manifold memeber is secured in sealing relation with said manifold member by screws and said limiting sliders.

9. The apparatus according to claim 5 wherein said adjusting elements include a central bore extending in the axial direction.

10. The apparatus according to claim 5 wherein a resilient damping member is positioned between said limiting slider and a pressure responsive adjusting piston.

11. The apparatus according to claim 5 wherein said adjusting screws include a plastic insert forming a section of the screw jacket in the threaded area.

12. The apparatus according to claim 10 wherein the position of the limiting slider is determined by a stop screw extending approximately parallel to the valve bore.

13. The apparatus according to claim 10 wherein flexible spraying tubes are disposed between said nozzles and said spray head carrier.

14. The apparatus according to claim 13 wherein said flexible spraying tubes are externally threaded at said spraying head carrier end.

15. The apparatus according to claim 14 wherein the spraying nozzle carrier includes at least one pressure fluid nozzle attached to said nozzle tube and supplied with pressure fluid by said manifold member.

16. The apparatus according to claim 13 wherein said spraying nozzles are attached to the free end of said respective spraying tube and swivelled separately with respect to the tube axis at said free end.

17. The apparatus according to claim 1 including means directly feeding pressure fluid to individual throttle valves or groups of throttle valves in the form of a stored program control.

* * * * *